United States Patent [19]

Zrostlik

[11] Patent Number: 4,564,057

[45] Date of Patent: Jan. 14, 1986

[54] BEAD LOOSENING TOOL

[75] Inventor: Francis L. Zrostlik, Garner, Iowa

[73] Assignee: Iowa Mold Tooling Company, Inc., Garner, Iowa

[21] Appl. No.: 553,960

[22] Filed: Nov. 21, 1983

[51] Int. Cl.$^4$ .............................................. B60C 25/00
[52] U.S. Cl. ...................................................... 157/1
[58] Field of Search .................. 157/1, 1.1, 1.17, 1.26, 157/1.28; 254/93 R; 72/705

[56] References Cited

U.S. PATENT DOCUMENTS

| | | | |
|---|---|---|---|
| 2,579,868 | 12/1951 | Schmid | 157/1.28 |
| 3,635,440 | 1/1972 | Van Gompel | 254/93 R |
| 4,273,311 | 6/1981 | Rio | 254/93 R |
| 4,279,141 | 7/1981 | Gallart | 254/93 R X |

Primary Examiner—James G. Smith
Attorney, Agent, or Firm—Wood, Dalton, Phillips, Mason & Rowe

[57] ABSTRACT

A bead loosening tool for loosening the axially inner bead of a tire in a dual wheel set without disassembling the set and a method of bead loosening for loosening the axially inner bead of such tires. The apparatus includes a pair of elongated arms movable between open and closed positions. In the closed position, the arms are sufficiently close to each other as to be insertable in the space between the tires of a dual wheel set. A motor is provided for driving the arms apart to loosen the bead.

According to the method, the tool is inserted between the tires of a dual wheel set and relatively movable surfaces of the tool positioned against the rim of the axially inner wheel of the set and the tire wall adjacent the bead of the axially outer tire in the set. The surfaces are then moved apart to achieve bead loosening.

2 Claims, 4 Drawing Figures

U.S. Patent   Jan. 14, 1986   4,564,057
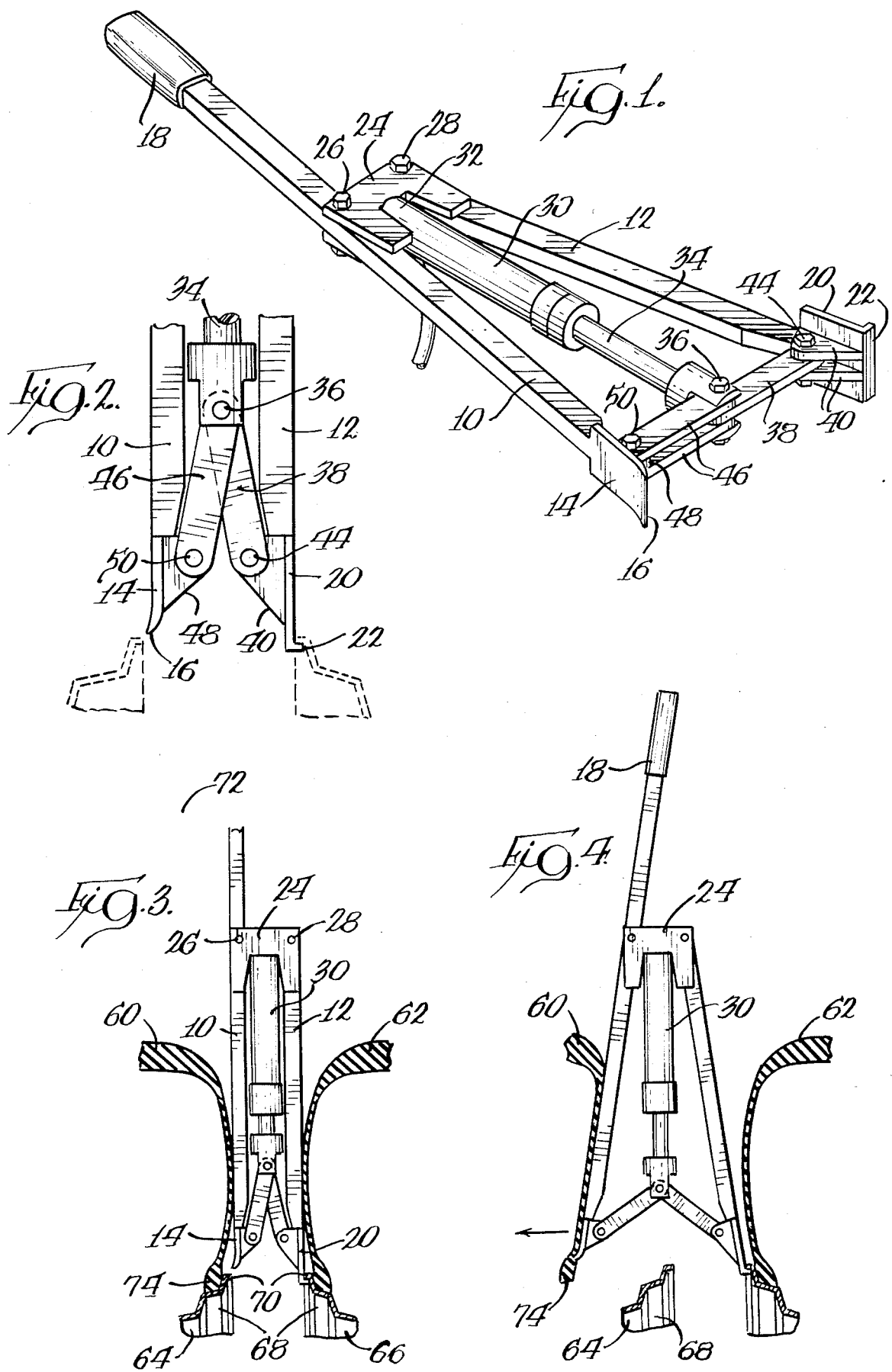

BEAD LOOSENING TOOL

FIELD OF THE INVENTION

This invention relates to a tool for loosening the bead of a tire mounted on a wheel, and more specifically, a tool for loosening an axially inner bead of a tire in a dual wheel set without disassembling the wheels of the set from each other or demounting the wheels from a vehicle.

BACKGROUND ART

To increase agricultural productivity, increasing numbers of farmers are resorting to farm tractors having dual rear wheels or dual wheels at all four corners of the vehicle. The use of dual wheels increases the pulling power of a given tractor and quite desirably reduces the compaction of the underlying soil on which the tractor is traveling.

Heretofore, if the outside tire in a dual wheel set, that is, the tire of the pair most remote from the vehicle chassis, requires replacement and/or repair as a result of a cut, break, leak or the like, the wheel on which such tire was mounted would have to be disassembled from the other wheel of the set and removed from the tractor for servicing since it was impossible to loosen both beads of the tire from the wheel rim.

It is, of course, relatively simple to loosen the axially outer bead, that is, the bead of the tire most remote from the vehicle chassis, with existing tools. However, the loosening of the axially inner bead of the outer tire while the wheel remains assembled to the other wheel in the set and on the vehicle has heretofore been impossible by reason of the obstruction to access to such axially inner bead posed by the other tire and wheel of the dual wheel set. If it were possible to loosen such axially inner beads, the tire could then be removed from the wheel while the wheel remains mounted on the vehicle thereby effecting a considerable time savings.

SUMMARY OF THE INVENTION

It is the principal object of the invention to provide a new and improved bead loosening tool that may be operated to loosen the axially inner bead of the axially outer wheel and tire assembly in a dual wheel set without separating the wheels of the set or removing the same from a vehicle.

An exemplary embodiment of the invention achieves the foregoing object in a construction including a pair of elongated arms, at least one arm having a length generally sufficient to extend from the tread of a tire in a dual wheel set to about the rim of the wheel on which the tire is mounted. Means interconnect the arms for relative movement between a closed position wherein the arms are sufficiently close to each other as to be insertable between the tires of a dual wheel set and an open position wherein adjacent ends of the arms are sufficiently spaced so as to loosen an axially inner bead on one of the tires in the dual wheel set. One of the arm ends is formed as a bead loosening shoe drivable between the bead of a tire and the rim flange of the wheel on which the tire may be mounted while the other of the arm ends includes a retaining surface adapted to engage and be retained by a wheel rim. Motor means are mounted on the tool for pivoting the arm between the two previously mentioned positions and an elongated handle is provided on the tool such that it extends generally oppositely away from the arm ends and is adapted for use by an operator to engage and retain the retaining surface on a wheel rim and to provide an urging force tending to drive the shoe between the bead of a tire and the rim flange of the wheel on which the tire is mounted.

In a preferred embodiment, the ends are pivotally interconnected for movement between the two positions and the shoe and the retaining surface are oppositely directed for engagement with one tire and the other wheel of a dual wheel set, respectively. The effective length of the arm having the retaining surface is somewhat longer than that of the arm having the bead loosening shoe.

Desirably, the retaining surface comprises a hook-like flange at the end of the arm having the retaining surface.

In a highly preferred embodiment, the interconnecting means comprises a support plate to which the arms are individually pivoted and the motor means comprises an expandable fluid cylinder having one end mounted to the support plate between the arms and the other end pivoted to at least two links disposed between the arms. The links are further pivoted to respective ones of the arm ends.

The invention contemplates that the handle may comprise an extension of one of the arms, and specifically, an extension of the arm having the bead loosening shoe.

The invention also contemplates a method of loosening the axially inner bead of a tire forming one of two slightly spaced tires on respective adjacent wheels defining a dual wheel set without disassembling one wheel from the set or removing the set from a vehicle. The method includes the steps of (a) inserting a tool having two relatively movable surfaces between the tires of a dual wheel set while the wheels thereof are interconnected on a vehicle; (b) locating one of the tool surfaces against the bead of one of the tires while locating the other of the tool surfaces against the wheel mounting the other of the tires; (c) moving the tool surfaces apart to loosen the bead of the one tire; and, if necessary to fully loosen the bead of the one tire, repeating steps (b) and (c) at one or more different locations about the periphery of the dual wheel set.

Other objects and advantages will become apparent from the following specification taken in connection with the accompanying drawings.

DESCRIPTION OF THE DRAWINGS

FIG. 1 is a perspective view of a bead loosening tool made according to the invention in its open condition;

FIG. 2 is a fragmentary plan view of the end of the tool when in a closed position;

FIG. 3 is a somewhat schematic view illustrating the orientation of a tool to the tires and wheels of a dual wheel set preliminary to loosening the bead; and FIG. 4 is a view similar to FIG. 3 but illustrating the interrelationship of the tool to the tires and wheels of the set after the bead has been broken.

DESCRIPTION OF THE PREFERRED EMBODIMENT

An exemplary embodiment of a bead loosening tool made according to the invention is illustrated in the drawings and with reference to FIGS. 1 and 2 is seen to include a bead loosening arm 10 and a rim engaging arm 12. The bead loosening arm 10 terminates, at one end, in a bead loosening shoe 14 which may be in the form of a slightly curved plate tapering to a rounded edge 16 at its end. The overall length of the bead loosening arm 10 is considerably longer than that of the rim engaging arm 12 and at the end opposite the shoe 14 terminates in a handle 18.

The end of the arm 12 adjacent the bead loosening shoe 14 terminates in a rim engaging surface defined by a plate 20. Preferably, the end of the plate 20 remote from the arm 14 terminates in an axially outwardly directed flange or hook-like formation 22.

At least one of the arms 10 and 12 has a length sufficient to extend generally at least from the tread of a tire to the rim of a wheel on which the tire may be mounted. In the illustrated embodiment, the presence of the handle 18 on the arm 10 provides this attribute.

The arms 10 and 12 are connected together for relative movement between a closed position (shown fragmentarily in FIG. 2) and an open position as shown in FIG. 1. In the closed position, shown somewhat schematically in FIG. 3, the arms 10 and 12 are generally parallel with their oppositely facing outer surfaces less than five inches apart. Thus, they are sufficiently close when in the closed position to extend between the tires of a dual wheel set which typically are spaced from four to eight inches apart.

In the open position, the components are configured so as to space the shoe 14 and the rim engaging plate 20 a distance of about 14 inches which it has been found is sufficient to loosen the bead of a tire in a dual wheel set.

To achieve such interconnection, a pair of U-shaped support plates 24 are utilized. At the intersection of the bight of each U-shaped plate 24 and one leg, a bolt 26 is located which extends through the plates 24 and the arm 10 intermediate its ends to thereby pivot the arm 10 to the plates 24.

At the intersection of the bight of the plates 24 and the opposite leg, a similar bolt 28 is utilized to pivotally mount the arm 12 to the plates 24.

A motor is provided for driving the arms 10 and 12 between the open and closed positions and is in the form of a hydraulic cylinder 30. It is contemplated that the cylinder 30 can be operated by a conventional air-hydraulic pump which in turn is operated by an air compressor. As is well known, such pumps can generate several tons of hydraulic pressure while being supplied compressed air at 100-150 psig.

The head end 32 of the cylinder is secured to the bight of the support plates 24 by any suitable means such that the extensible, rod end 34 of the cylinder 30 is directed toward the shoe 14 and the retaining plate 20.

A bolt 36 extends through the rod 34 of the cylinder 30 and pivotally mounts a first link 38 which in turn extends to a point between two tongues 40 located on the back of the retaining plate 20, that is, the side thereof remote from the hook-like formation 22. A bolt 44 pivotally connects the link 38 to the tongues 40, and thus to the retaining plate 20.

The link 38, at its end connected to the rod 34, is sandwiched by a pair of links 46 which in turn extend toward the bead loosening shoe 14 to sandwich a tongue 48 on the rear surface thereof. A bolt 50 pivotally secures the links 46 to the shoe 14 via the tongue 48.

It will be appreciated that the just described linkage comprises a power amplifying linkage. Thus, while a force of, for example, 10,000 psig may be generated within the cylinder 30, as the rod 34 approaches the position illustrated in FIG. 1, a considerably greater force will be present in the direction of movement of the shoe 14 and retaining plate 20 as they move away from each other.

Operation is as follows. Referring to FIG. 3, the axially outer tire of a dual wheel set is designated 60 while the inner tire is designated 62. The wheel mounting the tire 60 is shown at 64 while the wheel mounting the tire 62 is shown at 66 and it will be seen that each has a rim 68 terminating in an axially directed rim flange 70. For purposes of the present invention, only the flange 70 on the axially inner wheel 66 is of significance.

With the tool arms 10 and 12 in their closed position, the tool is inserted into the space between the tires 60 and 62 with the bead loosening shoe 14 facing the axially outer tire 60, that being the tire whose bead is to be loosened. The hook-like formation 22 is disposed just radially inwardly of the flange 70 on the axially inner wheel 66 and to this end, the effective length of the rim engaging arm 12 may be made slightly longer than that of the bead loosening arm 10. By the term effective length it is meant the length between the ends of such arms at their tire engaging surfaces to the point of interconnection of the arms, it being immediately apparent that by reason of the extension of the arm 10 defining the handle 18, the overall length of the same is considerably greater than that of the arm 12.

With the hook-like formation 22 disposed just radially inwardly of the flange 70, the edge 16 is located just radially outwardly of the flange 70 of the wheel 64 and the cylinder 30 provided with hydraulic fluid under pressure. At the same time, the operator grasps the handle 18 and moves the same in the direction of an arrow 72. This movement of the handle 18 by the operator tends to assure that the hook-like formation 22 firmly engages the radially inner surface of the flange 70 of the wheel 66 so that pivoting of the tool at that point may occur. As a consequence, the pivoting motion supplied by the operator tends to drive the shoe 14 between the bead 74 of the tire 60 and the associated rim 68 of the wheel 64. Continued operation of the hydraulic cylinder 30 ultimately provides sufficient force so that the bead 74 breaks loose from the rim 68 of the wheel 64 as shown in FIG. 4. This is, of course, due to the fact that the rim engaging arm 12 is relatively immovable by reason of its abutment with the wheel 66.

Quite unexpectedly, bending of the rim 68 of the axially inner wheel 66 is not encountered given the large magnitude of the forces involved. This evidently is due to the fact that such wheels are typically made of relatively sturdy fabrication and the fact that the inflation pressure within the tire 62 on the radially inner wheel is applied via the bead of the tire 62 to the rim 68 of the wheel 66 to reinforce the same against bending.

In many cases, one operation of the tool as just described is sufficient to fully loosen a bead such as the bead 74 about its periphery and point of engagement with the wheel 64. In some instances, however, the operation must be repeated at a different location about the periphery of the dual wheel set and in such case, after the initial loosening operation, the tool is simply retracted to its closed position and moved angularly about the wheel to another location and the operation repeated as many times as may be necessary. In the vast majority of cases, only one or two operations of the tool are required.

In the case where one or more of the tires are filled with a liquid, the use of the tool may be preceded by a pumping operation to pump as much of the liquid out of the tire whose bead is to be loosened as possible.

From the foregoing, it will be appreciated that a tool made according to the invention and the inventive method allow the loosening of beads of tires where access thereto is extremely limited thereby enabling the beads of the axially outer tires and dual wheel sets to be loosened to facilitate tire removal from the wheel without disassembling the axially outer wheel from the axially inner wheel of a dual wheel set and from the vehicle on which they are mounted.

I claim:

1. A method of loosening an axially inner bead of a tire forming one of two slightly spaced tires mounted on repective adjacent wheels defining a dual wheel set without disassembling one wheel from the set or removing the set from a vehicle comprising the steps of:

(a) inserting a tool having two relatively movable surfaces between the tires of a dual wheel set while the wheels thereof are interconnected on a vehicle;
   (b) locating one of said tool surfaces against the bead of one of the tires while locating of other of said tool surfaces against the wheel mounting the other of the tires;
   (c) moving said tool surfaces apart to loosen the bead of said one tire; and
   if necessary to fully loosen the bead of said one tire, repeating steps (b) and (c) at one or more different locations about the periphery of the dual wheel set.

2. The method of claim 1 wherein step (c) is accompanied by the step of urging said one tool surface radially inwardly to drive said one tool surface between the bead of said one tire and the rim flange of the wheel on which said one tire is mounted.

* * * * *